May 24, 1932.  C. M. MacCHESNEY ET AL  1,859,336
ROTARY SHEARING MACHINE
Filed Jan. 4, 1929  11 Sheets-Sheet 1

Inventors
Chester M. MacChesney
Ralph H. Norton
By Rector, Hibben, Davis & Macauley, Attys.

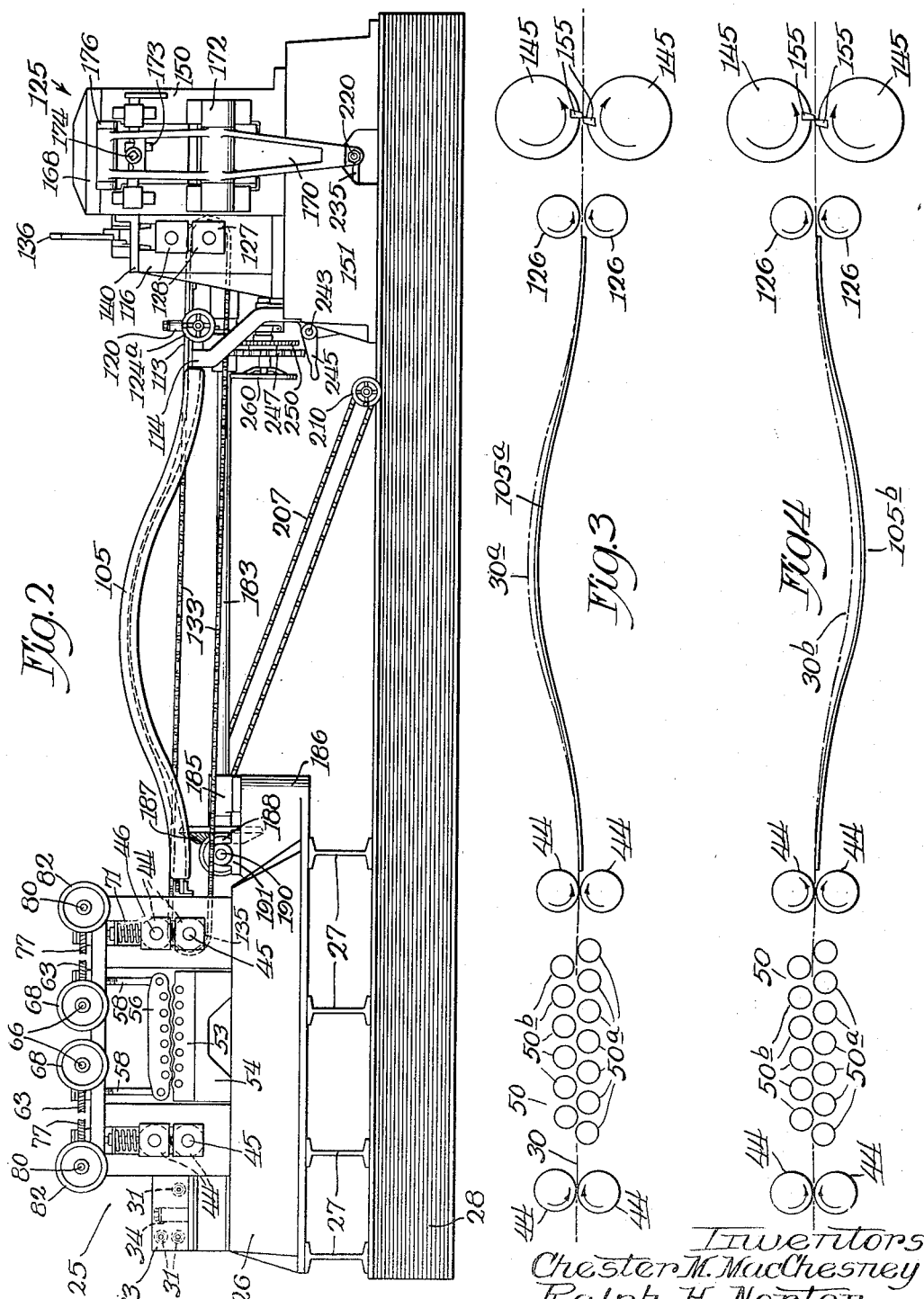

May 24, 1932.  C. M. MacCHESNEY ET AL  1,859,336
ROTARY SHEARING MACHINE
Filed Jan. 4, 1929  11 Sheets-Sheet 3

Inventors
Chester M. MacChesney
Ralph H. Norton
By Rector, Hibben, Davis & Macauley,
Attys.

May 24, 1932.   C. M. MacCHESNEY ET AL   1,859,336
ROTARY SHEARING MACHINE
Filed Jan. 4, 1929   11 Sheets-Sheet 6

Inventors:
Chester M. MacChesney
Ralph H. Norton
By Rector, Hibben, Davis & Macauley, Attys.

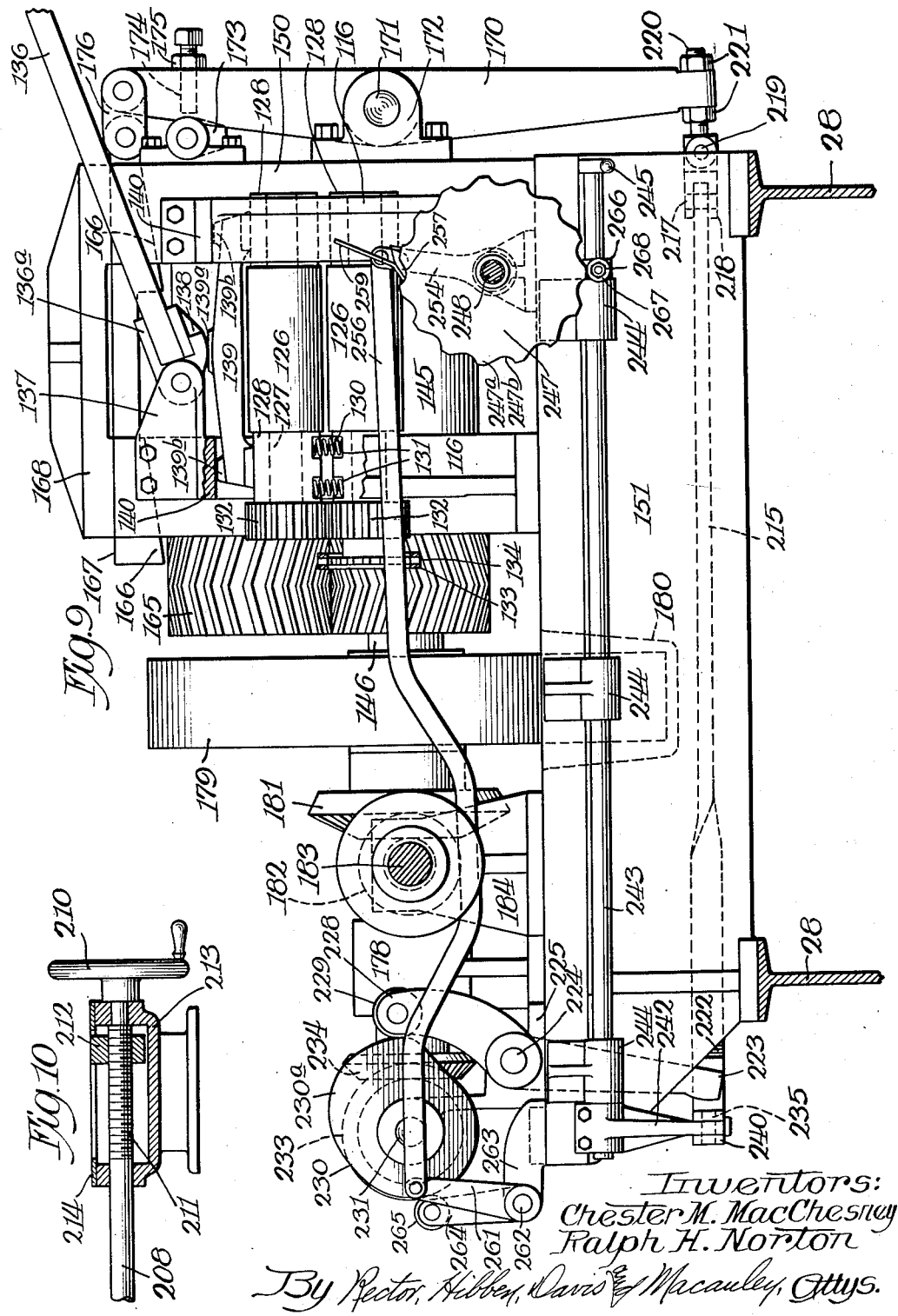

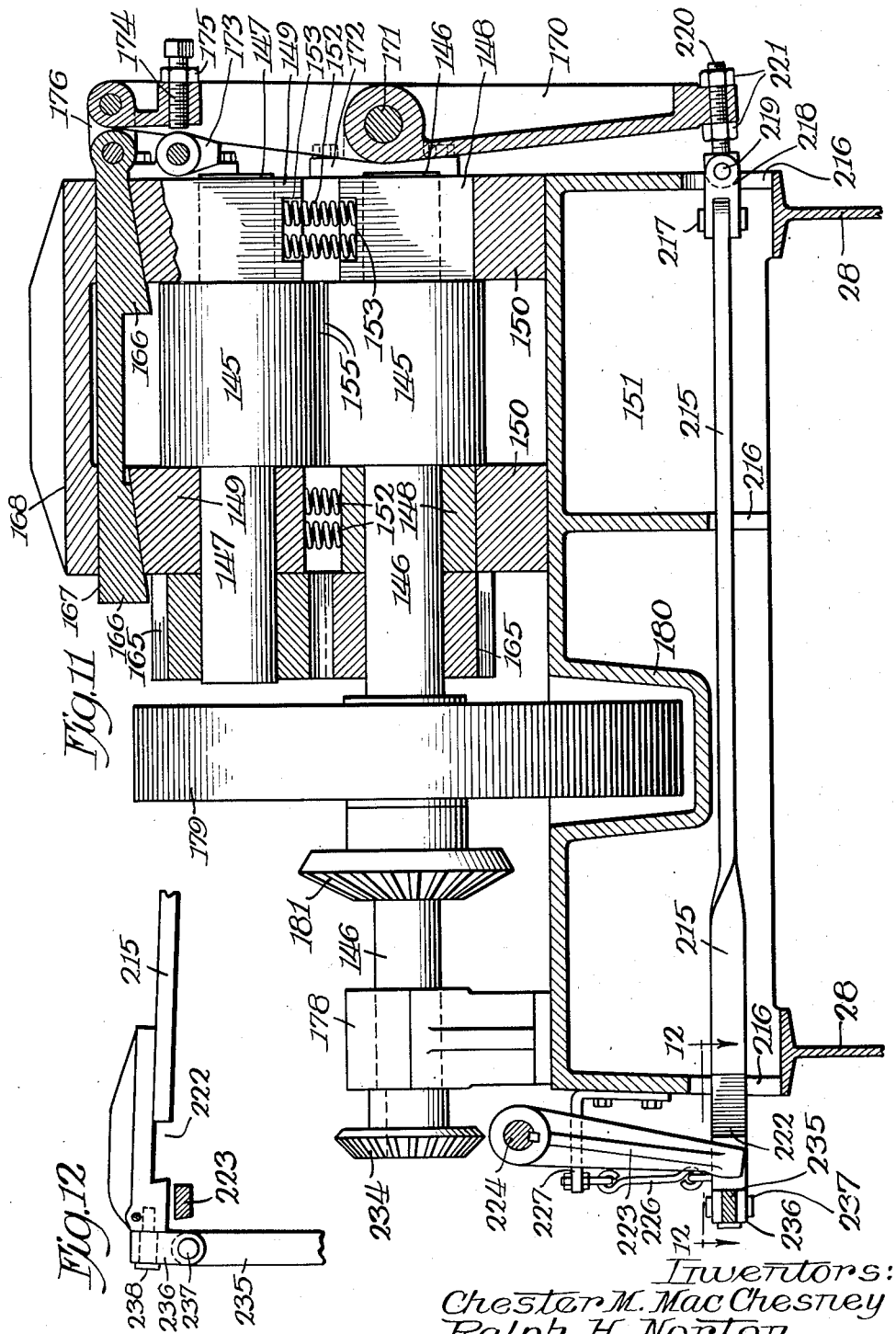

May 24, 1932.  C. M. MacCHESNEY ET AL  1,859,336
ROTARY SHEARING MACHINE
Filed Jan. 4, 1929  11 Sheets-Sheet 9

Inventors
Chester M. MacChesney
Ralph H. Norton
By Rector, Hibben, Davis & Macauley, Attys.

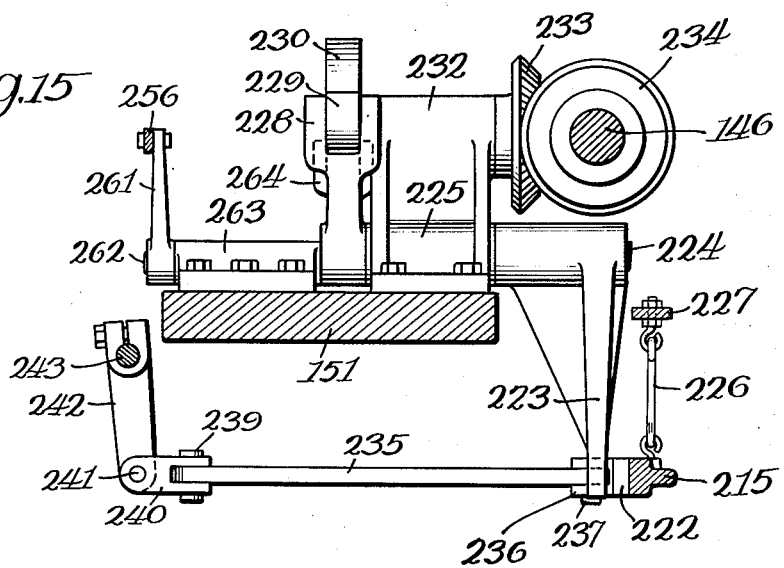
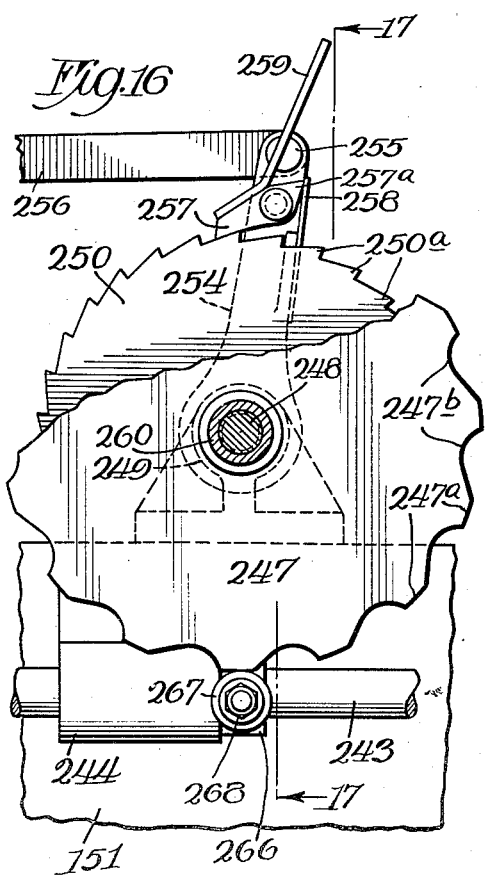
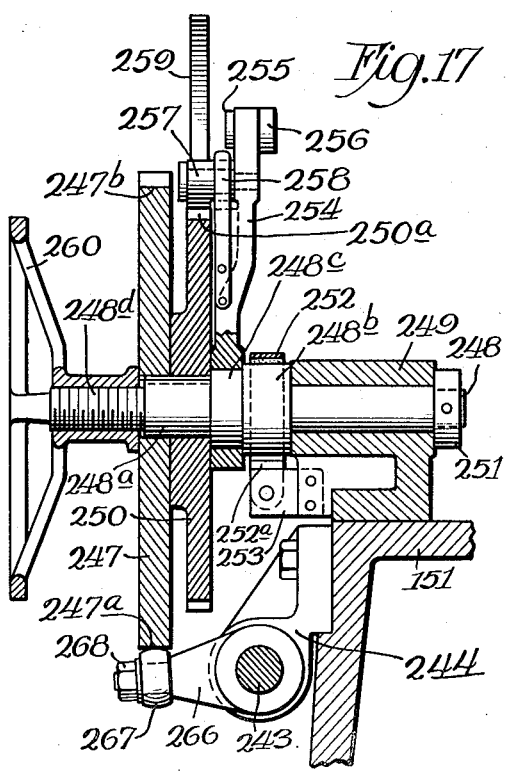

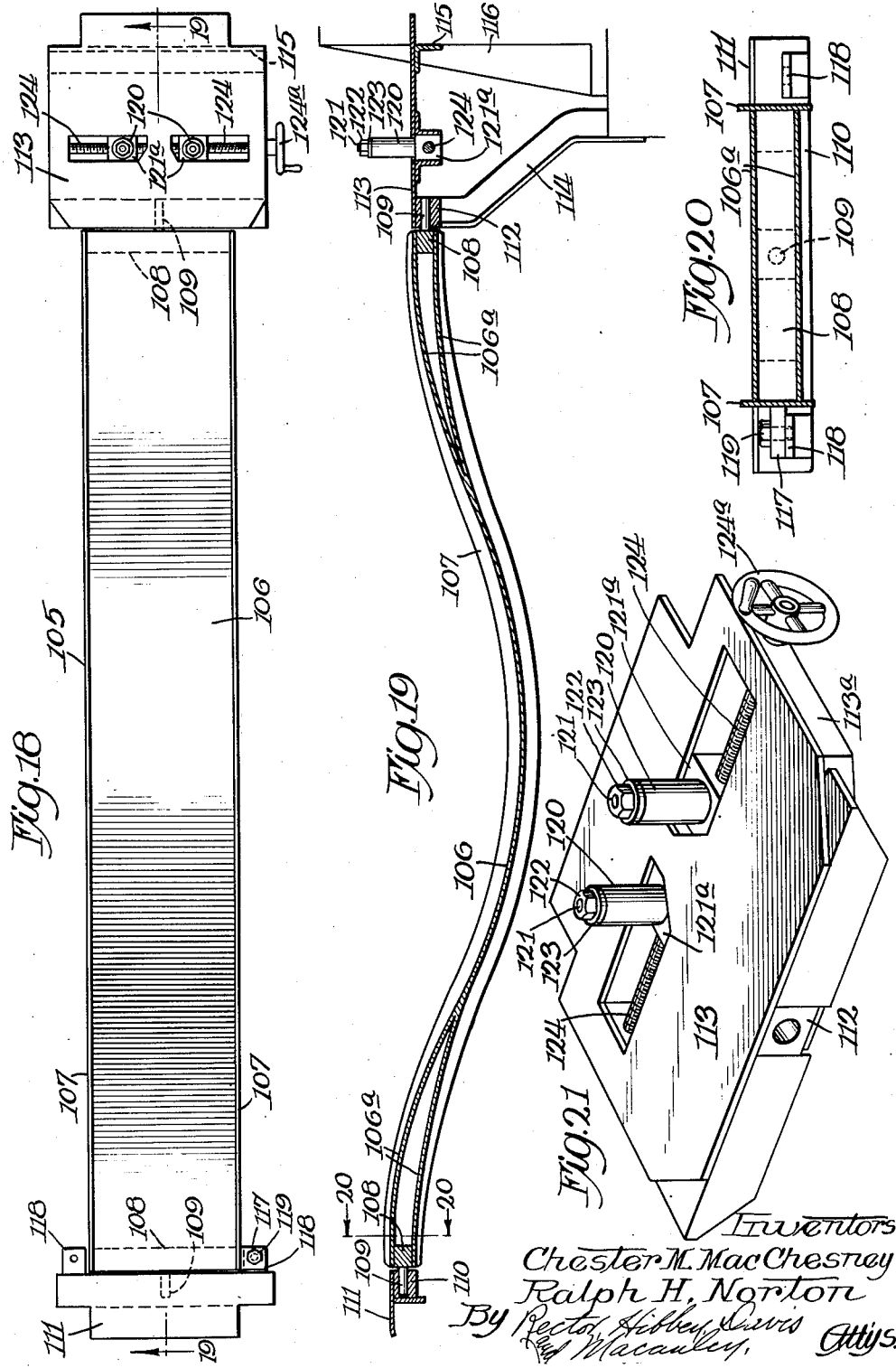

Patented May 24, 1932

1,859,336

UNITED STATES PATENT OFFICE

CHESTER M. MacCHESNEY AND RALPH H. NORTON, OF CHICAGO, ILLINOIS, ASSIGNORS TO ACME STEEL COMPANY, OF CHICAGO, ILLINOIS, A CORPORATION OF ILLINOIS

ROTARY SHEARING MACHINE

Application filed January 4, 1929. Serial No. 330,394.

This invention relates to a rotary shearer and its purpose is to provide an improved machine for cutting metal sheets and strips into parts or sections of predetermined length or size. The principal object of the invention is to provide a rotary shearing device which may be employed in steel mills and the like for shearing hot or cold metal sheets to form parts or sections of various predetermined lengths. An important object of the invention is to provide a rotary shearer comprising adjustable means to accurately predetermine the lengths of the severed parts of the metal strip throughout a wide variation of lengths and for substantially any small variation of increase or decrease in size or length. A further object of the invention is to provide a rotary shearer in combination with means for compensating for the retardation of the moving metal strip when it is momentarily engaged by the shearing blades. Still another object of the invention is to provide means whereby an initial curvature is imparted to the advancing metal strip before it reaches the rotary shearing blades so that upon engagement of these blades with the moving strip the hump or curvature in the strip is automatically increased to compensate for the retardation of the end of the strip engaged by the blades. A further important object of the invention is to provide means whereby an initial curvature which is produced in the advancing metal strip before it reaches the shearing blades is automatically reduced in amount upon engagement of the shearing blades with the metal strip, the extent of this reduction being utilized in effecting variation in the predetermined length of the sections cut from the metal strip. Still another object of the invention is to provide a rotary shearing machine comprising an evener for reducing irregularities in the metal strip in combination with rotary shearing devices and means for automatically feeding the metal strip from the evener to the shearing devices in such a way as to effect the cutting of sections of predetermined length. Another object is to provide an evener driven at constant speed in combination with variable speed shearing rolls having means for adjusting the speed of said rolls to produce a wide variation in the sections of the metal strip acted upon by the machine. A further object is to provide a machine having rotary shearing rolls provided with shearing blades in combination with means for causing the shearing blades to be operative upon each rotation of the rolls or only after any desired number of rotations of the rolls. Another feature of the invention is the provision of a curved feed table over which the metal strip is fed to the shearing rolls, having means whereby the position of the table may be reversed in order to impart to the advancing metal strip either an upward or a downward curvature. Other objects of the invention relate to various features of construction and arrangement which will appear more fully hereinafter.

The nature of the invention will be understood from the following specification taken with the accompanying drawings in which one embodiment is illustrated. In the drawings, Figure 1 shows a top plan view of the improved rotary shearer including the evener and the driving mechanism therefor;

Fig. 2 is a side elevation of the apparatus illustrated in Fig. 1;

Fig. 3 shows a diagrammatic side elevation of the rolls of the evener and of the shearing apparatus with the feed table positioned to effect an upward curvature of the metal strip during its movement from the evener to the shearing rolls;

Fig. 4 is a diagrammatic side elevation similar to that of Fig. 3 with the feed table reversed in order to cause the metal strip to sag during its travel from the evener to the shearing rolls;

Fig. 9 shows a sectional view taken on the line 9—9 of Fig. 8, illustrating an end elevation of the rotary shearing device;

Fig. 10 is an enlarged detail section taken on the line 10—10 of Fig. 8;

Fig. 11 shows a transverse section through the rotary shearing device taken on the line 11—11 of Fig. 8;

Fig. 12 is a detail section taken on the line 12—12 of Fig. 11, showing the means for making a driving connection with the connecting rod by which the shearing rolls are rendered operative at predetermined intervals;

Fig. 15 is a sectional view taken on the line 15—15 of Fig. 8, showing a portion of the actuating mechanism by which the operation of the shearing rolls is controlled;

Fig. 16 shows an elevation of the cam and ratchet mechanism which controls the operation of the means for regulating the number of revolutions of the shearing rolls between successive operations of the shearing blades;

Fig. 17 is a detail section taken on the line 17—17 of Fig. 16;

Fig. 18 is an enlarged top plan view of the feed table and associated parts over which the elongated metal strip is fed from the evener to the shearing rolls;

Fig. 19 shows a longitudinal section on the line 19—19 through the device illustrated in Fig. 18;

Fig. 20 shows a transverse section taken on the line 20—20 of Fig. 19; and

Fig. 21 is a perspective view of the parts illustrated at the discharge end of the curved feed table for guiding the metal strip to the shearing rolls.

Figure 5:
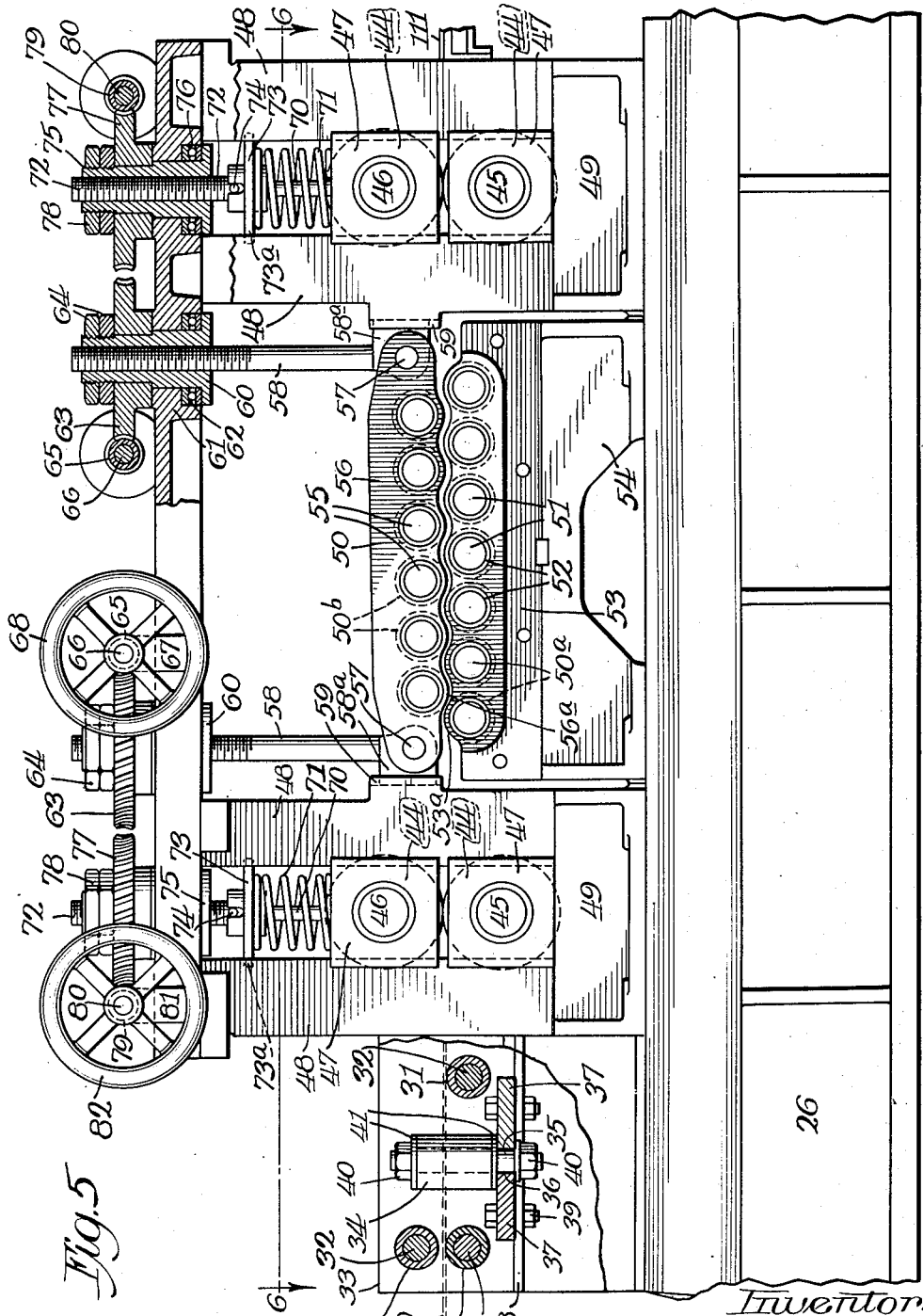
Fig. 5 is an enlarged side elevation of the evener with parts thereof illustrated in vertical section.
Figure 6:
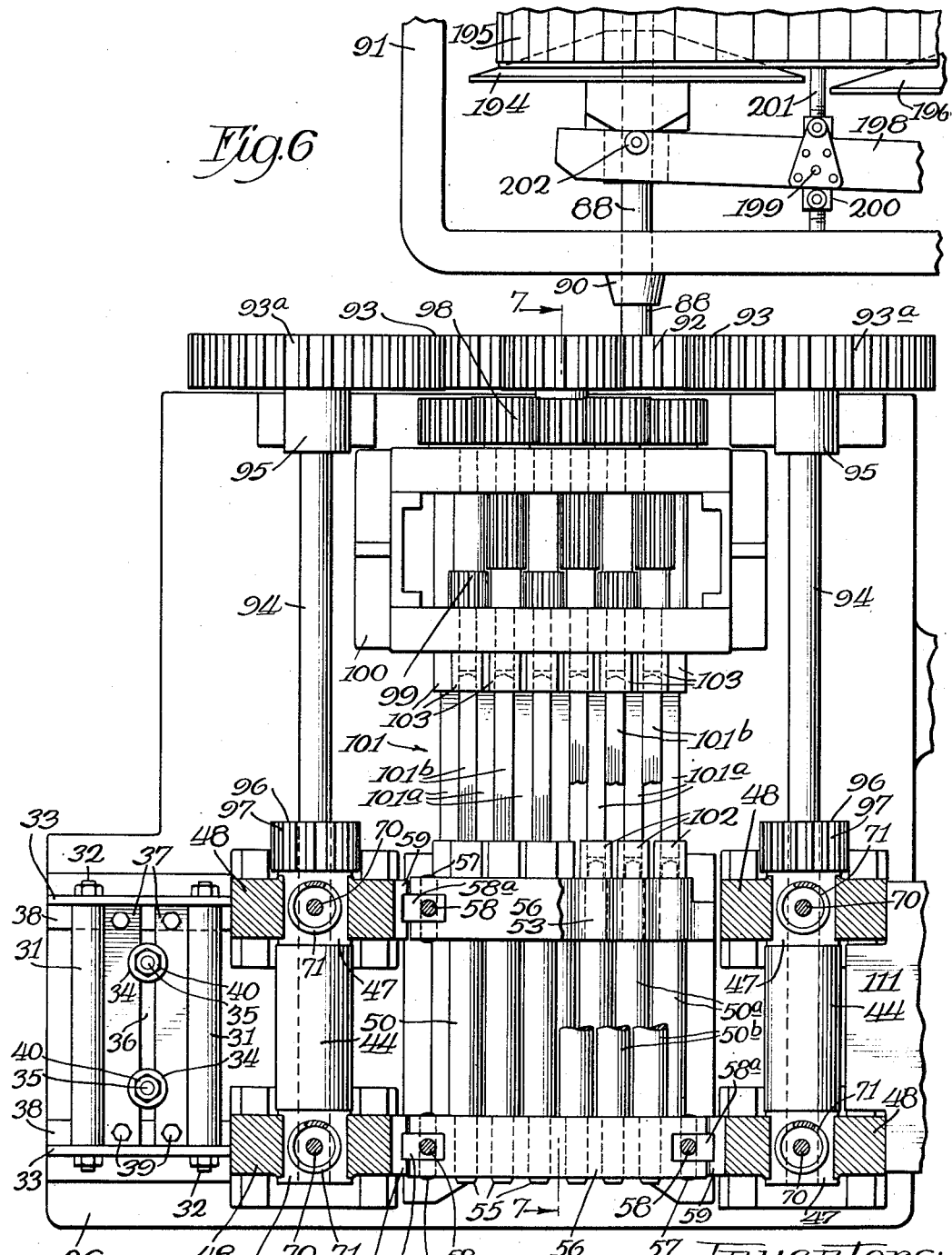
Fig. 6 is a horizontal section through the evener taken on the line 6—6 of Fig. 5.

The material operated upon by the apparatus disclosed in the accompanying drawings may be a very long metal strip, such as a strip of cold rolled steel, for example, which is fed endwise to the apparatus in a continuous length to be cut up into sections of the desired length. The surface contour of this elongated strip may be more or less irregular and, in order to smooth out these irregularities before the strip is cut up into sections, the strip is first engaged by the evener 25 which comprises a base 26 mounted on a plurality of transverse beams 27 which are in turn supported by the longitudinal beams or frame members 28, as illustrated particularly in Fig. 2. In passing to the evener 25, the metal strip, illustrated by dotted lines at 30, passes between a pair of horizontal idler rolls 31 which are mounted on shafts 32 extending between the side plates 33 which are secured on the base 26 and the strip then passes between a pair of vertical idler rolls 34 which are mounted to rotate on supporting pins or bolts 35, as shown particularly in Figs. 5 and 6. The pins 35 engage slots 36 in a plate 37 which is secured to flanges 38 carried by the plates 33 by means of bolts 39. The pins 35 are adapted to be secured in place by the nuts 40 which engage the upper and lower ends thereof, so that the rollers 34 may be spaced apart to guide the edges of metal strips of various widths. Washers 41 engage the upper and lower ends of the rollers 34 to permit the free rotation thereof without interference with the stationary parts. After passing between the vertical idler rolls 34, the metal strip 30 passes over another horizontal idler roll mounted on another horizontal shaft 32 and it then passes between a pair of pressure and feeding rolls 44 which are mounted horizontally with their shafts 45 and 46 journaled in bearing blocks 47 which are movable vertically between the guide blocks 48 extending upwardly from the base 26. Upon emerging from the rolls 44, the metal strip 30 passes through the evener rolls 50 by which the irregularities in the strip are taken out. These evener rolls comprise a lower set of stationarily mounted rotatable rolls 50$^a$ and an upper set of adjustable rotatable rolls 50$^b$. The shafts 51 of the lower evener rolls 50$^a$ are journaled in bushings 52 mounted in the bearing blocks 53 which are carried by the frame 54 mounted on the base 26. These bearing blocks 53 are secured rigidly in place and the bearings of the shafts 51 are located in a straight horizontal line so that the upper portions of the peripheral surfaces of the rolls 50$^a$ are in alignment with each other and with the contacting portions of the previously mentioned rolls 44. The shafts 55 of the upper set of evener rolls 50 are journaled in bearing blocks 56, the ends of which are pivotally connected by pins 57 with the guide members 58$^a$ which are formed as heads on the lower ends of the hangers 58. The guide members 58$^a$ engage guide flanges 59 which are formed on the guide blocks 48 extending upwardly from the frames 49 which are mounted on the base 26, and the hangers 58 are adjustable for the purpose of varying the spaced relation of the evener rolls 50$^b$ with respect to the stationarily mounted rolls 50$^a$. The axes of the shafts 55 of the rolls 50$^b$ are located in one plane and the rolls 50$^b$ are staggered with respect to the rolls 50$^a$ so that the peripheral surfaces of the two sets of rolls may be set to intermesh, to some extent, with each other, as illustrated in Fig. 5, the bearing blocks 53 and 56 having irregular contours on their adjacent edges as shown at 53$^a$ and 56$^a$, respectively, so that the convex portions of these curved edge surfaces are concentric with the peripheral surfaces of the rolls carried by these respective bearing blocks. There is thus formed a pathway of irregular contour between the lower rolls 50ᵃ and the upper rolls 50ᵇ through which the metal strip 30 passes and the bearing blocks 50ᵇ are preferably located at an inclination to the horizontal so that the extent of the intermeshing relation of the rolls 50ᵇ with the rolls 50ᵃ decreases gradually as the metal strip advances through these evener rolls. The effect of the engagement of the metal strip with the first evener rolls is to impart a wavy contour to the metal strip which may or may not be of greater magnitude than any of the irregularities in the metal strip as it is fed to the machine but which are regular in form extending transversely of the strip. As the strip advances between successive evener rolls, the spaced relation of which gradually increases, the wavy contour of the strip is gradually reduced until, as it emerges from the last evener rolls of the series, the wave has been taken out of the strip and all of the irregularities have at the same time been eliminated. For the purpose of holding the upper set of evener rolls 50ᵇ in the inclined position just referred to and to permit of a variation of the spaced relation of the rolls 50ᵇ with respect to the rolls 50ᵃ, the hangers 58 are in the form of screw threaded rods or shafts which are rotatably engaged by the adjusting nuts 60 which are rotatably mounted in bearings carried by the upper frame 61 which is mounted on the upper ends of the blocks 48. The upward thrust on each nut 60 is taken up by a roller bearing 62 and each adjusting nut 60 has a worm wheel 63 secured thereon above the frame 61, as shown in Fig. 5. The upper end of each adjusting nut 60 is threaded to be engaged by the lock nut 64. Each worm wheel 63 meshes with a worm 65 secured on a transverse adjusting shaft 66. Each shaft 66 is journaled in a bearing 67 carried by the frame 61 and a hand wheel 68 is secured upon the outer end thereof so that upon rotation of this handle the connected shaft 66 serves to raise or lower both of the hangers 58 located at one end of the set of evener rolls 50ᵇ. By the operation of the two hand wheels 68, either end of the set of rolls 50ᵇ may be adjusted vertically independently of the other end so that the spaced relation of the evener rolls and the inclination of the upper set of evener rolls may be varied as desired. After emerging from the last rolls of the evener rolls 50 the metal strip 30 passes between another pair of pressure and feed rolls 44, similar to those previously described, and similarly mounted in bearing blocks 47 located between the vertical guide blocks 48. Each bearing block 47 of each upper roll 44 is provided with an upwardly extending stem 70 around which is mounted a coil spring 71. The stem 70 slidably engages a central bore formed in the rotatable adjusting screw 72 and the lower end of this adjusting screw has a non-rotative engagement with a plate 73 with which a connection is formed by means of a transverse pin 74. The plate 73 is provided with notches 73ᵃ at its edges to receive the inner edges of the adjacent guide blocks 48 so that the plate 73 and the adjusting screw 72 are held against rotation. The upper portion of the adjusting screw 72 is threadedly engaged by an adjusting nut 75 which is journaled in a bearing formed in the top frame member 61 and which is provided with roller bearings 76 to receive the upward thrust on the adjusting screw. A worm wheel 77 is secured on the adjusting nut 75 above the frame 61 and the parts are held in assembled relation by the lock nuts 78. The two worm wheels 77 which are mounted on the adjusting nuts 75 associated with one pair of rolls 44, are arranged to mesh with worms 79 which are secured on the transverse shafts 80. These shafts are journaled in bearings 81 carried by the frame member 61 and are provided with hand wheels 82, similar to the hand wheels 68 previously described, so that the shafts 80 may be turned to regulate the position of the adjusting screws 72 and thereby regulate the compression of the springs 71 which determines the pressure exerted by the rolls 44 upon the metal strip passing therethrough. By adjusting the hand wheels 82, the rolls 44 may be regulated to accommodate metal strips of different gauges and to engage these strips with any desired degree of pressure. By adjusting the adjacent hand wheels 68, the inclination of the upper set 50ᵇ of the evener rolls and the spaced relation of the upper and lower sets of rolls may be correspondingly regulated to accommodate metal strips of different gauges and to provide for the removal of irregularities of different magnitude in the various metal strips acted upon by the apparatus.

Figure 1:
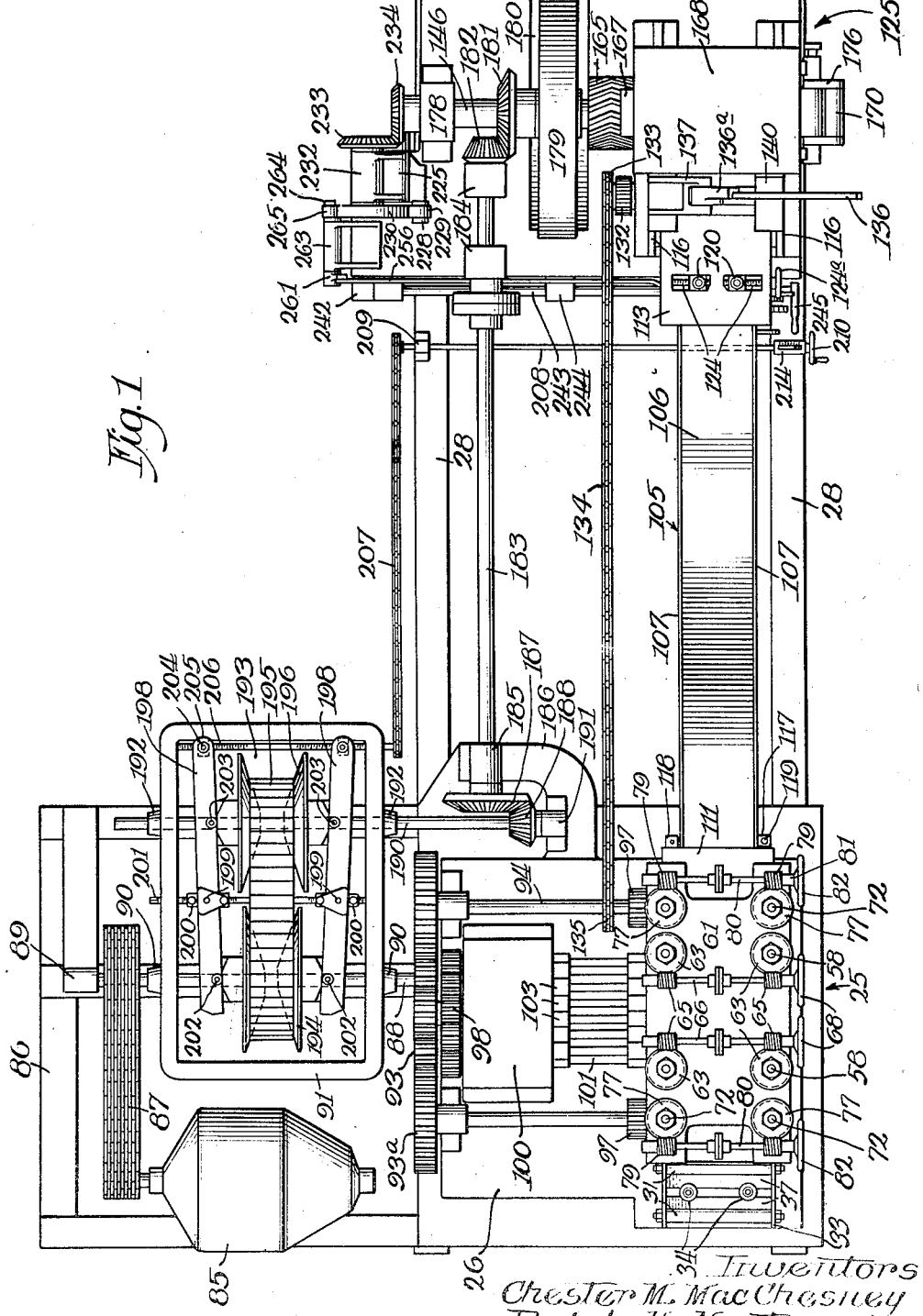
Figure 7:
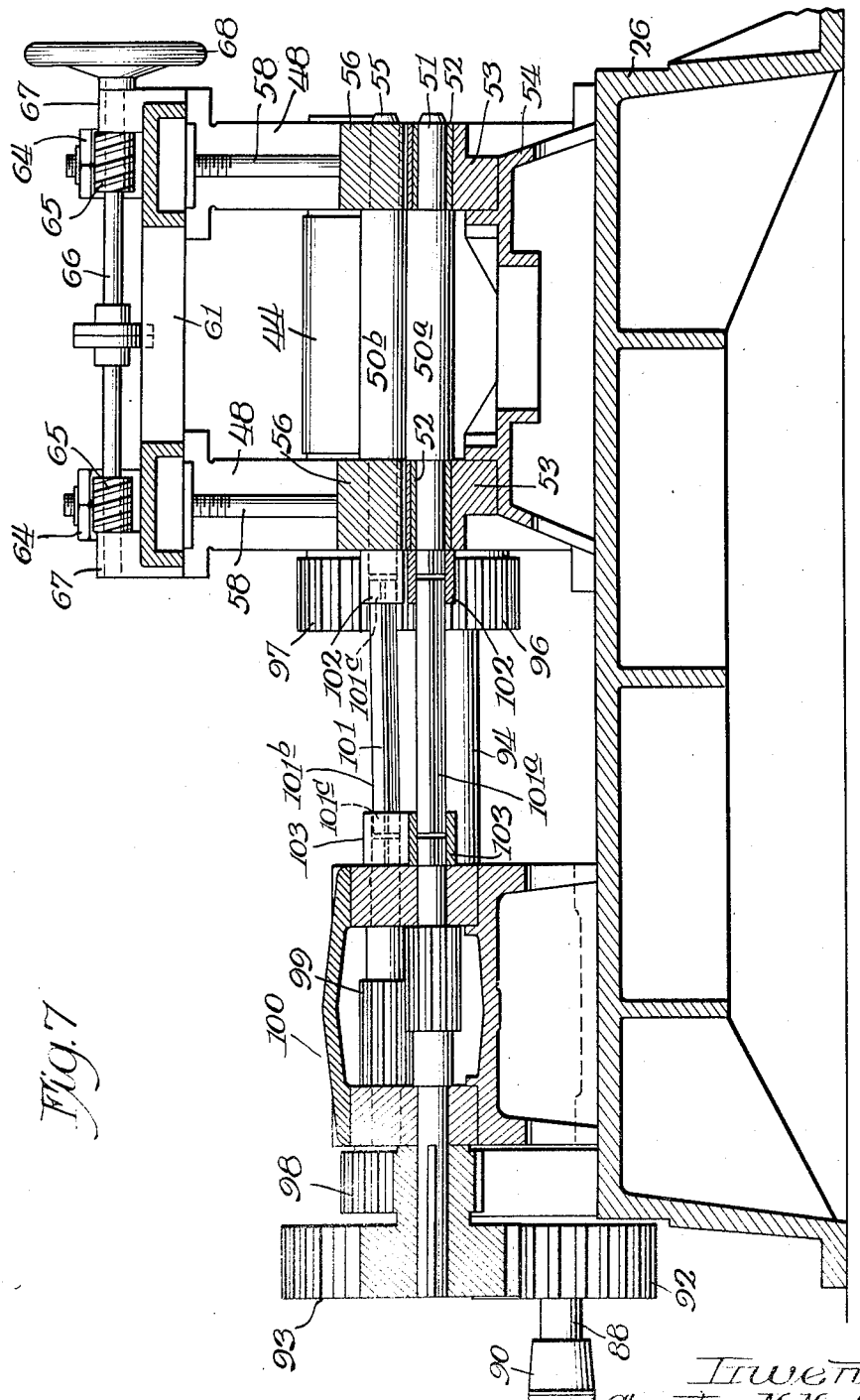
Fig. 7 is a transverse vertical section through the evener and a portion of its driving mechanism taken on the line 7—7 of Fig. 6.
Figure 8:
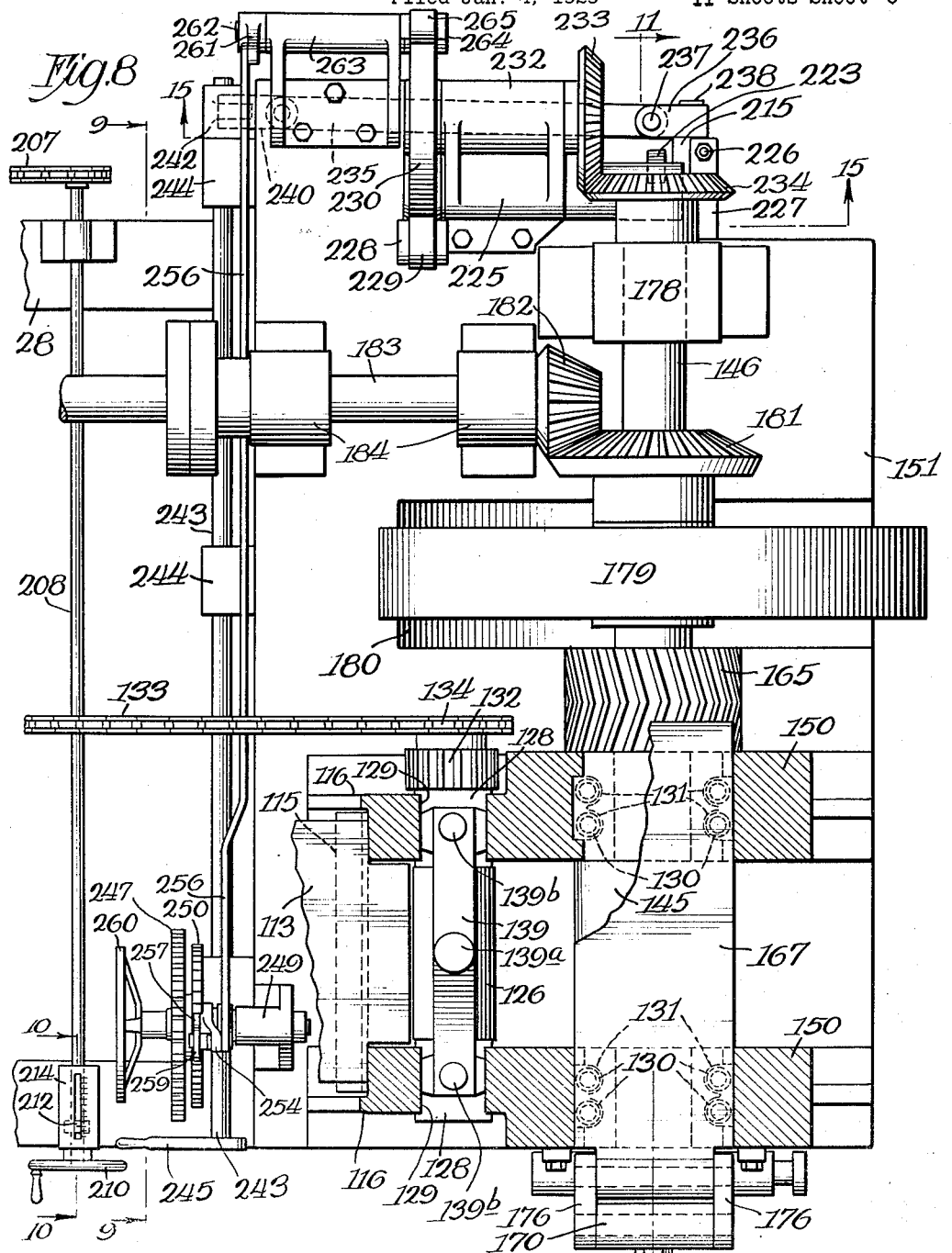
Fig. 8 shows a top plan view of the rotary shearing device with a portion thereof shown in horizontal section.
Figure 14:
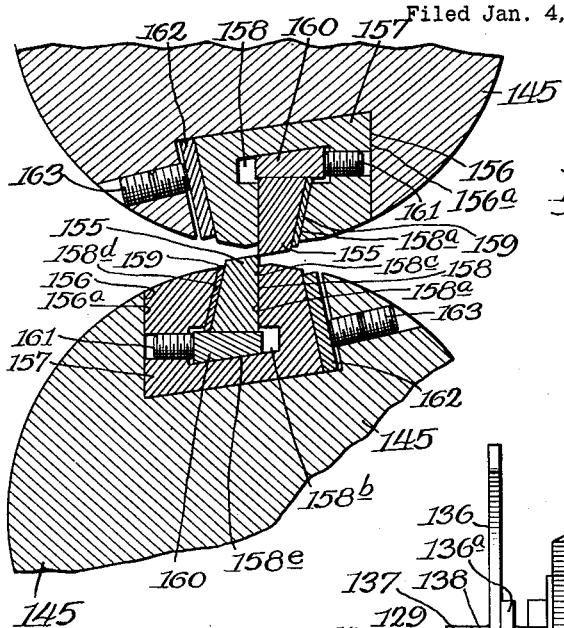
Fig. 14 shows a partial enlarged section taken through the shearing rolls transversely to their axes of rotation.

The evener 25 as well as the shearing rolls and other parts of the apparatus are driven from an electric motor 85 mounted on a frame formed by the lateral extensions of the beams 27 which are arranged with their extremities supported by a longitudinal beam 86, as shown in Fig. 1. The shaft of the electric motor 85 is connected through pulleys and a belt 87 with a main driving shaft 88 which is adapted to be driven at a constant speed proportional to the speed of the motor shaft. The shaft 88 is journaled in a bearing 89 carried by the frame members 27 and 86 and it is also journaled in bearings 90 carried by a rectangular frame 91 which is mounted above the members 27 and secured in fixed position thereon. The inner end of the shaft 88 has a gear 92 secured thereon, as shown particularly in Fig. 7, arranged to drive a series of gears 93 which are located adjacent the rear edge of the supporting frame 26. The endmost gears 93ᵃ of the gears 93 are fixed on the outer ends of shafts 94 which are journaled in bearings 95 carried by the base 26 and which drive the rolls 44. The lower roll of each set of rolls 44 is fixed on one of the shafts 94 and the other roll of the set is driven by a gear 96 fixed on the shaft 94 and meshing with a gear 97 fixed on the shaft of the other roll, as illustrated particularly in Figs. 6 and 7. Some of the other gears of the series of gears 93 are arranged to drive an intermediate set of intermeshing gears 98 which in turn operate a series of gears 99 located in the gear box 100 which is mounted on the base 26. The gears 99 operate two series of horizontally arranged shafts 101 of which the lower series 101$^a$ are connected to drive the shafts of the lower series of evener rolls 50$^a$ while the upper series of shafts 101$^b$ are connected to drive the upper series of evener rolls 50$^b$. The shafts of the rolls are connected with the shafts 101 by couplings 102 and similar couplings 103 connect these shafts with the shafts of the actuating gears 99. The couplings 102 are provided with apertures of rectangular cross section which are loosely engaged by the extremities 101$^c$ of the shafts 101 so that some variation in position of the axes of the upper evener rolls 50$^b$ is permitted without disturbing the driving connection between the gear box 100 and the evener rolls. By this arrangement of driving mechanism, the evener rolls 50 and the pressure and feed rolls 44 are driven at all times at constant speed.

After emerging from the evener 25 and the last set of rolls 44 thereof, the metal strip 30 passes over a feed table 105, being moved by the actuation of the rolls 44 in advance of this table. The feed table 105 is illustrated particularly in Figs. 1, 2, 3, 4, 18, 19 and 20. This table is relatively long and narrow and is provided with a hump or curved projection 105$^a$ at its center, as shown in Figs. 2 and 3, which, upon reversal of the position of the table, becomes a depression shown at 105$^b$ in Fig. 4. The table is made up of a sheet metal supporting member 106 having side flanges 107 which project above and below the edges of the supporting member 106 so that the metal strip is retained in position thereon. Adjacent its ends, the member 106 is divided a shown at 106$^a$ and the upper and lower parts thereof are extended on opposite sides of transverse members 108, each of which is provided with a central trunnion 109. At the forward end of the feed table, the trunnion 109 is journaled in a transverse bar 110 located beneath the plate 111 over which the metal strip 30 moves in passing from the last set of rolls 44. The trunnions 109 permit the feed table 105 to be reversed in its position, and in either position, the uppermost end surface of the supporting plate 106 lies flush with the upper surface of the plate 111. At the discharge end of the feed table 105, the trunnion 109 engages a bar 112 mounted beneath the edge of an auxiliary table 113 which is supported in part by the brackets 114 and in part by a transverse frame member 115 carried by the supports 116. When the table is in either position, it is supported against pivotal movement about a longitudinal axis by means of a lug 117 secured to the forward end thereof and adapted to rest on either one of the flanges 118 which project outwardly from the bar 110. A bolt 119 is adapted to secure the lug 117 to either one of the flanges 118 which are illustrated particularly in Fig. 18. When the table 105 is in a position to form an upwardly extending hump or curve 105$^a$, as shown in Fig. 3, a corresponding normal curvature is imparted to the metal strip as it advances from the table toward the shearing rolls and at the moment of engagement of the shearing blades with the metal strip, the momentary retardation of the strip causes it to bow upwardly from the hump 105$^a$ of the feed table as shown at 30$^a$. This arrangement of parts is employed when the shearing rolls are moved at a speed such that the linear speed of the shearing blades is equal to or less than the speed or travel of the metal strip to be sheared. When the shearing rolls operate at a greater speed so that the linear speed of the shearing blades is greater than that of the metal strip to be sheared, the shearing rolls tend to exert a pull on the metal strip at the instant when this strip is engaged by the blades and, under those conditions, the table 105 is reversed to from the depression 105$^b$ shown in Fig. 4. With this arrangement, when the shearing blades engage the metal strip, the pull on the strip merely tends to reduce the sag in the strip in the region of the depression 105$^b$, as shown at 30$^b$. The auxiliary table 113 is shown particularly in Fig. 21 where it is illustrated as a flat plate having a pair of spaced rollers 120 projecting upwardly therefrom. These rollers are adapted to serve as guides for the edges of the metal strip which is being advanced over this auxiliary table to the shearing machine and the spaced relation of the rollers is adjustable to accommodate metal strips of different width. Each roller is mounted to rotate on a pin or bolt 121 which is engaged at its upper end by a nut 122 and washers 123. The pin or bolt 121 has an enlarged head 121$^a$ which is engaged by the threaded adjusting screw 124 journaled in bearings carried by the frame members 113$^a$ of the table and having a hand wheel 125 secured to one end thereof. By rotating this handle, the two rollers 120 are simultaneously moved toward and from each other by reason of the fact that the opposite ends of the adjusting screw 124 are threaded in opposite directions to engage corresponding inclined threads formed on the heads 121$^a$.

Figure 13:
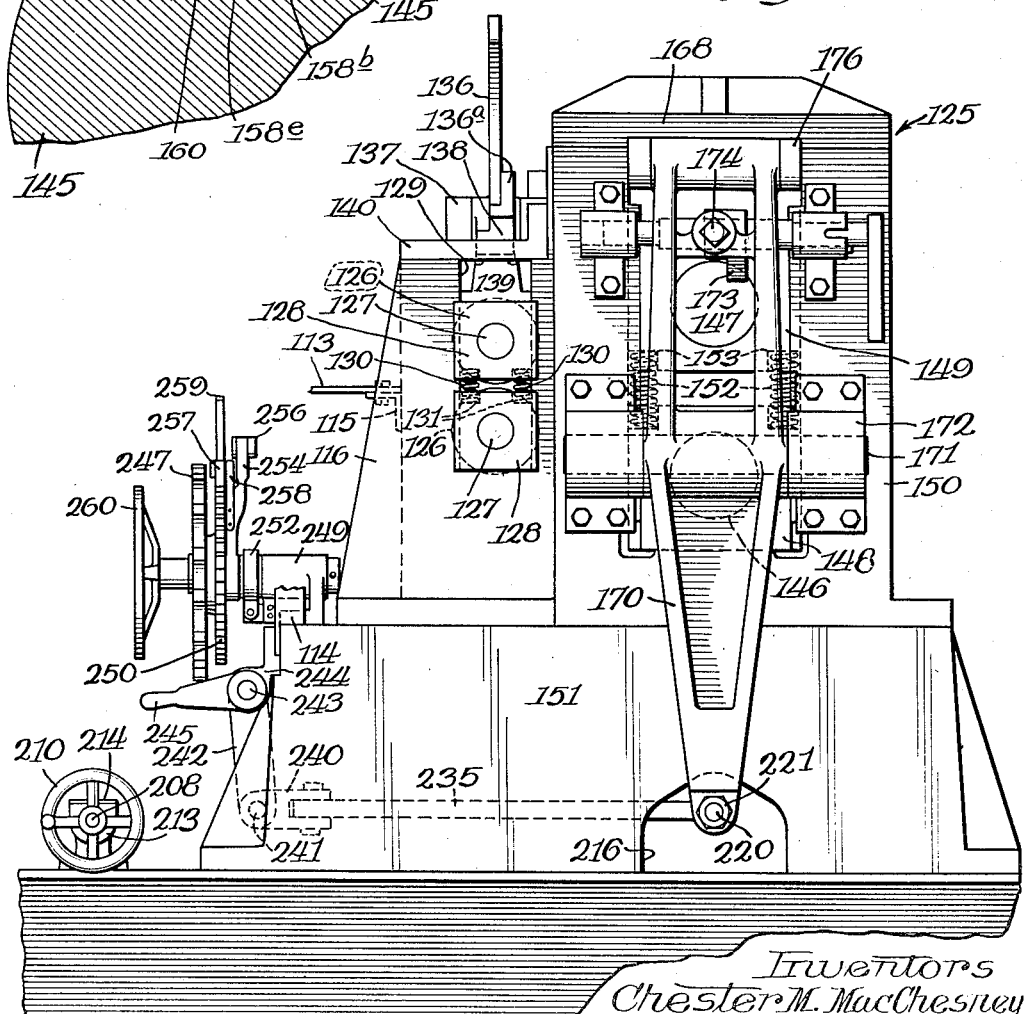
Fig. 13 shows an enlarged side elevation of the rotary shearing apparatus, the view being similar to that illustrated in Fig. 2.

The metal strip 30 passes from the auxiliary feed table 113 to the rotary shearing machine 125 of which the supports or side plates 116, previously referred to, form a part, as illustrated particularly in Fig. 13. As the metal strip passes from the table 113 it is directed between a pair of auxiliary feed rolls 126 which are carried by shafts 127 journaled in bearing blocks 128 which are mounted in the rectangular vertical slots 129 formed in the side plates 116. The bearing blocks 128 have coil springs 130 mounted between them with their ends engaging recesses 131 formed in the blocks, as shown in Figs. 9 and 13, so that these springs tend normally to separate the rolls 126 from each other. The shafts 127 of these rolls have meshing gears 132 fixed thereon and the shaft of the lower roll is provided with a relatively fixed sprocket wheel 133 which is driven by an endless sprocket chain 134 extending around another chain sprocket 135 on one of the shafts 94 of the rolls 44, previously described, as shown in Fig. 1, so that the auxiliary feed rolls 126 are continuously driven during the operation of the evener 25. These auxiliary feed rolls are intended primarily for use in feeding to the shearing machine the last section of a long length of metal strip after the end of that section has passed the last set of rolls 44. The rolls are normally separated by the springs 130 and when the operator desires to bring the rolls into close driving engagement with the metal strip, the upper roll 126 is moved downwardly and this is effected by the operation of a lever 136 which has a head 136ª pivoted on a bracket 137 carried by one of the side plates 116. The head 136ª is provided on its under side with a cam face 138 which is adapted to bear against the flat surface 139ª formed on a cross head 139, the ends of which are secured to the bearing blocks 128 of the upper roller 126. When these bearing blocks are in their uppermost position under the influence of the springs 130, the lugs 139ᵇ at the ends of the cross head engage the plates 140 which close the upper end of the slots 129 in which the bearing blocks are mounted.

The metal strip passes from the auxiliary feed rolls 126 to the shearing rolls 145, the mounting of which is illustrated particularly in Figs. 9, 11, 13 and 14. The shaft 146 of the lower roll and the shaft 147 of the upper shearing roll are journaled in bearing blocks 148 and 149, respectively, mounted in vertical guides formed in the side frame members 150. These side frame members and the side plates 116 are mounted on a base 151 which is supported by the longitudinal frame members 28 previously described. The lower bearing blocks 148 are stationary but the upper bearing blocks 149 are adjustable and are normally separated from the lower bearing blocks by the action of coil springs 152. Two pair of these springs are mounted between each bearing block 148 and its associated bearing block 149, the springs being seated in recesses 153 formed in the bearing blocks, as shown in Fig. 11. These springs 152 normally maintain such a separation of the shearing rolls 145 that the metal strip 130 passing between the rolls is not acted upon by the shearing blades 155 which are mounted in these rolls in the manner illustrated in Fig. 14. To permit a detachable mounting of the shearing blades, each roll 145 is provided with a longitudinal groove 156 having undercut outwardly converging sides 156ª and each groove is engaged by a longitudinal bar 157. This bar 157 is in turn provided with a longitudinal groove 158 made up of a radially extending portion 158ª and a transversely extending portion 158ᵇ. One face 158ᶜ of the groove 158 extends radially of its shearing roll 145 and is engaged by a corresponding radial face of the shearing blade 155. The opposite inclined face of the shearing blade is engaged by a shim 159 which fits between the plate and the inclined wedging surface 158ᵈ of the bar 158. The blade and the shim are forced outwardly by the action of a wedge 160 which engages the transverse portion 158ᵇ of the groove in the bar and is forced inwardly against the wedging surface 158ᵉ of this groove by means of a plurality of adjusting screws 161. After the shearing blade has been mounted in its bar 157, the bar is placed in the groove 156 in the roll with a shim 162 along one side thereof and then the bar is secured rigidly in place in the roll by adjusting the screws 163 against the shim 162.

The shearing rolls 145 are adapted to be rotated continuously by the mechanism hereinafter described and the bearings 149 of the upper shearing roll 145 are adapted to be moved downwardly at intervals to cause the shearing blades 155 to move into shearing engagement with the metal strip passing between these rolls. The teeth of the gears 165 should be in mesh even when the rolls 145 are separated in order to maintain the proper relative arrangement of the two shearing blades 155 during the rotation of the shearing rolls. If the rolls 145 are maintained in the relatively close relation shown in Figs. 11 and 14, the metal strip passing between the rolls will be sheared at each revolution of the rolls but, if desired, the downward movement of the bearing blocks 149 of the upper shearing roll 145 may be effected only after a predetermined number of revolutions of the rolls so that the intervening revolutions of these rolls will have no effect in shearing the metal strip being operated upon. The downward movement of the bearing blocks 149 against the compression of the springs 152 is effected by a pair of wedges 166 formed on a bar 167 which is adapted to move longitudinally of the rolls 145 in the slots of the side frames 150 which are engaged by the blocks 148 and 149. The upper side of the bar 167 is engaged by the cross frame member 168 which connects the upper ends of the side frames 150. Upon movement of the bar 167 towards the right as viewed in Fig. 11, the bearing blocks 149 are moved downwardly and the gears 165 are moved into mesh with each other. This actuating movement of the bar 167 is effected by a vertically extending lever 170 which is pivoted on an axle 171 extending between brackets 172 carried by the frames 150. The lower end of this lever 170 is connected with certain operating mechanism hereinafter described by which the operation of the wedge-carrying bar 167 may be effected either manually, or automatically at predetermined intervals. If desired, the lever 170 may be located with its upper end in its outermost position to maintain the rolls 145 in close spaced relation to effect a shearing operation upon each rotation thereof, by means of a pivoted stop member 173 which is carried by the frame members 150 and which may be swung outwardly so that its free end bears against a stop screw 174 mounted in the upper part of the lever 170 and held in adjusted position by a lock nut 175. The upper end of the lever 170 is pivotally connected to the bar 167 through links 176 so that the pivotal movement of the lever will not interfere with the linear movement of the bar.

The shaft 146 of the lower shearing roll 145 projects beyond the gear 165 mounted thereon and is journaled in a stationary bearing 178 carried by the base 151. A pulley or flywheel 179 is secured on this shaft adjacent the gears 165 and the base 151 is provided with a depression 180 to receive the lower portion of this flywheel. The shaft 146 is driven through a bevel gear 181 which is secured thereon adjacent the flywheel and which meshes with a bevel pinion 182 secured on the extremity of a transverse driving shaft 183 which is journaled in bearings 184 carried by the base 151 and also in a bearing 185 carried by a bracket 186 which extends outwardly from the base 26 of the evener 25, as shown in Fig. 1. A bevel gear 187 fixed on the end of the shaft 183 meshes with a bevel pinion 188 fixed on the variable speed shaft 190 which is journaled in a bearing 191 carried by the bracket 186 and also in bearings 192 carried by the rectangular frame 91 previously described. The shaft 190 is adapted to be driven from the constant speed shaft 88 through certain variable speed mechanism 193 located within the frame 91. This variable speed mechanism comprises a pair of cone pulleys 194 which are splined on the shaft 88 and which are connected by a friction belt 195 with a pair of cone pulleys 196 which are splined on the shaft 190. The belt 195 is provided with tapered edges to conform to the taper of the pulleys 194 and 196 and the speed with which the shaft 190 is driven depends upon the spaced relation of the cone pulleys of each pair. The pulleys of one pair 194 are adapted to be moved in a direction opposite to the direction of the other pair by certain adjusting mechanism comprising a pair of levers 198 which are pivoted at 199 on sleeves 200 which are threadedly engaged by an adjusting shaft 201 mounted in bearings carried by the opposite sides of the rectangular frame 91. Upon rotating this shaft, the spaced relation of the pivotal supports 196 of the levers 198 may be adjusted. The levers 198 are pivotally connected at 202 to the opposite outer sides of the pulleys 194 and they are pivotally connected at 203 to the outer sides of the opposite pulleys 196. The outer ends of these levers are pivotally connected at 204 to members 205 which are threadedly engaged by an adjusting screw 206 so that when this screw is rotated the levers are rocked about their pivots 199 thereby effecting a simultaneous adjustment of the cone pulleys of each pair. As the belt 195 rides outwardly on the cone faces of the pulleys 194, due to the adjustment of these pulleys toward each other, it simultaneously moves inwardly on the cone faces of the pulleys 196, thereby increasing the speed of the shaft 190. Upon reversing the direction of adjustment of the pulleys 194 and 196, the opposite effect is obtained. This rotation of the adjusting shaft 206 is brought about from a position adjacent the shearing machine 125 through operating connections comprising a sprocket chain 207 which passes around a sprocket gear on the shaft or screw 206 and around another sprocket gear fixed on the shaft 208. The shaft 208 is journaled in bearings 209 carried by the longitudinal frame members 28 and one end thereof has a hand wheel 210 secured thereon. Adjacent this hand wheel, the shaft 208 is threaded as shown at 211 in Fig. 10 and this threaded portion is engaged by an adjustable index block 212 which travels in a housing 213 provided with a graduated cover plate 214 having a slot therein engaged by the upper edge of the block 212. The reading of the index mark on the block 212 with respect to the graduations of the cover plate 214 serves to indicate to the operator the speed of rotation of the shearing rolls 145.

The variation in the speed of the shearing rolls which is brought about by adjusting the variable speed mechanism 193 through the operation of the hand wheel 210, is utilized for obtaining a variation in the lengths of the sections which are cut from the metal strip 30 by the action of the shearing blades, but a still greater variation in the length of these sections is obtained by varying the frequency with which the shearing rolls 145 are brought into shearing relation with each other. As heretofore indicated, this is effected by the operation of the lever 170 shown particularly in Figs. 9, 11 and 13. The lever 170 is actuated by a rod 215 which extends beneath the base 151 through openings 216 provided therein, as shown in Fig. 11. One end of this rod is pivotally connected by a vertical pin 217 with a connecting member 218 which is in turn connected by a horizontal pivot 219 with an eye bolt 220 which adjustably engages an aperture in the lower end of the lever 170 and which is held in adjusted position by lock nuts 221. The opposite end of the rod 215 projects beyond the base 151 and is provided with a notch 222 adapted to be engaged by the lower end of a crank arm 223 which is fixed on a horizontal shaft 224. When this shaft is rocked in its bearings 225 carried by the base 151, with the lower end of the crank engaging the notch 222, the rod 215 is reciprocated longitudinally to effect the operation of the lever 170. The rod 215 is supported for this longitudinal movement by a link 226 which is pivotally suspended from a bracket 227 carried by the base 151 and which is pivotally connected at its upper end with the rod 215 adjacent the notch 222. The rocking movement of the shaft 224, upon which the crank 223 is mounted, is effected by an arm 228 secured on the shaft 224 and provided at its free end with a roller 229 adapted to bear on the peripheral surface of a cam 230. This cam has a projection 230ª which is adapted to engage the roller 229 upon each revolution of the cam to actuate the crank arm 223 and thereby bring the rolls 145 into shearing relation with each other, assuming that the lower end of the crank 223 is in engagement with the notch 222. The cam 230 is fixed on a shaft 231 which is journaled in a bearing 232 carried by the base 151 and which is driven by a bevel gear 233 fixed on the other end thereof and arranged to mesh with a bevel gear 234 fixed on the shaft 146 of the lower shearing roll. The cam 230 is thus driven constantly during the operation of the shearing rolls, but the action of the lever 170 for moving the upper shearing roll 145 toward the lower shearing roll is varied by regulating the engagement of the crank arm 223 with the notch 222 in the rod 215. The movement of the rod 215 to a position where the notch 222 engages the lower end of the crank arm 223, takes place about the vertical pivot 217 at the other end of the rod and this swinging movement of the rod is effected by a horizontal link 235 which is attached to the rod 215 through a clevis 236 provided with a vertical pin 237 engaging the link 235 and with a horizontal pivot pin 238 by which it is attached to the end of the rod 215, as shown in Figs. 12 and 15. The other end of the horizontal link 235 is connected by a vertical pivot pin 239 with a clevis 240 which is attached by a horizontal pivot pin 241 with the lower end of a crank arm 242 clamped on the horizontal rock shaft 243. This rock shaft 243 is journaled in bearings 244 carried by the base 151, as shown in Fig. 9, and it extends throughout the length of the shearing machine 125, being provided at the end opposite the crank 242 with a hand lever 245, illustrated in Fig. 13, which permits the shaft 243 to be rocked manually for the purpose of moving the notch 222 in the bar 215 into and out of engagement with the crank arm 223. This rocking movement of the shaft 243 may also be effected by a rotatable cam disk 247 shown particularly in Figs. 9, 16 and 17. This cam disk is provided with a plurality of teeth or projections 247ª with intermediate curved depressions 247ᵇ and it is mounted on the part 248ª of a spindle 248 which is journaled in a bearing 249 carried by the base 151. A ratchet wheel 250 is mounted on the part 248ª of this spindle. Both the cam disk 247 and the ratchet wheel 250 are keyed on the spindle to cause them to rotate together and the spindle is secured in its bearing by the enlarged portion 248ᵇ thereof which engages one end of the bearing and by the detachable collar 251 which engages the other end of the bearing. This enlarged portion 248ᵇ of the spindle is engaged by a brake band 252 having the projecting ears 252ª thereof attached to a plate 253 which is secured to the bearing member 249. The spindle is provided between the parts 248ª and 248ᵇ with a part 248ᶜ upon which there is rotatably mounted the hub of an arm 254 which is pivotally connected at its upper end by a pin 255 with a link 256. A pawl 257 is pivoted on the arm 254 and is adapted to engage the teeth 250ª of the ratchet wheel 250. The pawl is retained in engagement with the teeth of the ratchet wheel by a leaf spring 258 which is secured to the arm 254 and arranged with its free end engaging a lug 257ª on the pawl. The pawl is also provided with a handle 259 which may be manually engaged to release the pawl from the teeth of the ratchet wheel when desired. Both the cam disk 247 and the ratchet wheel 250 are removed from the spindle 248 and are replaceable by other similar members having different numbers of teeth. They are clamped in position on the spindle by a hand wheel 260 having a hub which threadedly engages the threaded extremity 248ᵈ of the spindle. The link 256 which is attached to the upper end of the pawl carrying arm 254 extends longitudinally of the machine, as shown in Fig. 9, being offset downwardly beneath the shaft 283, and its other end is pivotally connected to a crank arm 261 which is secured on a horizontal shaft 262 journaled in bearings 263 carried by the base 151. The arm 264 is also secured on the shaft 262 and this arm carries a roller 265 which bears on the peripheral surface of the cam 230 previously described so that when the projection 230ª of the cam engages the roller 265, the arm 264 and the link 256 are moved toward the left as viewed in Fig. 9, thereby causing the arm 254 and its pawl 257 to rotate the ratchet wheel 250. An intermittent angular movement is thus imparted to the ratchet wheel on each rotation of the cam 230 and the cam disk 247 also partakes of this intermittent rotary movement. The rotary movement of the cam disk 247 serves to rock the shaft 243 through an arm 266 which is secured on the shaft 243 as shown in Fig. 17 and which is provided on its cylindrical extremity with a roller 267 adapted to contact with the peripheral surface of the cam disk. This roller is held in place by a nut 268 which engages the threaded extremity of the arm 266 and when the cam disk 247 is at rest, this roller engages one of the depressions 247$^b$ thereof. When the cam disk is moved angularly, the lever 266 is forced downwardly by one of the projections 247$^a$ of the cam disk, thereby rock the shaft 243 and causing the notch 222 in the rod 215 to engage the lower end of the crank arm 223 so that the cam 230 will then effect a longitudinal movement of the rod 215 and cause the lever 170 to force the upper shearing roll 145 downwardly by the action of the wedges 166. It will be apparent that by a suitable spaced arrangement of the projections 247$^a$ of the cam disk 247 the actuation of the lever 170 by the cam 230 may be caused to take place intermittently with any desired frequency, for example, upon every revolution of the shearing rolls or upon every second revolution thereof. Since the cam disks 247 and their actuating ratchet wheels 250 may be readily replaced, the machine may be conveniently provided with a cam disk 247 having the desired number of teeth to suit the requirements of the machine for the particular lengths of metal strips which are to be cut by the shearing blades.

In the operation of the machine described above, the elongated metal strip 30 which is usually relatively thin compared with its width, is fed to the evener machine 25 where it passes from the guide rolls 31 and 34 to the preliminary pressure and feeding rolls 44 which are driven at constant speed by the mechanism heretofore described. The metal strip advances from the first set of rolls 44 between the upper and lower sets of evener rolls 50 by which the bends and irregularities in the metal strip are removed before it reaches the last set of rolls 44. The rolls 44 and evener rolls 50 may be adjusted by the operation of the hand wheels 82 and 68, respectively, in order to obtain the desired action on the metal strip of the particular thickness being operated upon. From the last rolls 44, the metal strip moves endwise over the feed table 105. Assuming that this table is mounted with its curve directed upwardly to form a hump 105$^a$, as shown in Fig. 3, an upward curvature is maintained in the metal strip during its progress from the evener machine 25 to the shearing machine 125. This metal strip advances at constant speed and the table 105 is arranged in the manner illustrated in Figs. 2 and 3 when the shearing rolls 145 are operated at a speed such that the linear speed of the blades 155 is the same as or less than the linear speed of the advancing metal strip. Under these conditions, as the metal strip moves over the auxiliary feed table 113 and then between the auxiliary feeding rolls 126, it is engaged by the blades 155 of the shearing rolls which are so located that the blades are adapted to come together upon each rotation of the rolls, assuming that the rolls are in close spaced relation. To maintain this relation of the blades, which is illustrated in Fig. 4, it is necessary that the gears 165 be retained in mesh with each other at all times, even when the upper and lower rolls 145 are separated to the maximum extent. As the blades engage the metal strip, the strip is momentarily retarded while it is sheared by the blades 155 which are moved at a slower speed and this action is automatically compensated for by reason of the upward curvature of the metal strip on the feed table 105 which causes the strip to bend upwardly to a further extent, as shown in Fig. 3, during the period of retardation. As soon as the strip is sheared and the blades have passed around the axes of the rolls in their travel, the metal strip returns by gravity to contact with the curved portion of the table 105 and slips through between shearing rolls 145 as it again moves forwardly under the influence of the feeding rolls 44. If the speed of rotation of the shearing rolls 145 is relatively low, a greater length of metal strip passes between these rolls during one revolution thereof and the length of the section cut from the strip is thus relatively long as compared with the section which would be cut if the speed of rotation of the shearing rolls were higher. In addition, the extent of the upward curvature of the metal strip above the table 105 during the engagement of the shearing blades with the strip is greater when the speed of rotation of the shearing rolls is relatively low than it is when their rate of rotation is higher so that the portion of the metal strip which is projected between the shearing rolls by the return of the metal strip to contact with the curved portion of the table 105 immediately after the shearing operation increases with a decrease in the speed of rotation of the rolls because of the increase in the period of retardation. These factors are taken into account by the operator of the machine who may readily vary the speed of rotation of the shearing rolls by operating the variable speed apparatus 193 through rotation of the hand wheel 210 and thus a wide variation in the length of the metal sections is obtained for a given periodic operation of the shearing blades 105. In practice, a much wider range in the possible length of the sections cut from the metal strip may be obtained by varying the period between successive actuations of the blades 155 by causing a greater or lesser number of revolutions of the shearing rolls to take place between actuations of the lever 170 for moving the upper shearing roll downwardly into operative position. By employing a number of different cam disks 247 having different numbers of teeth, a wide range of length may be obtained in this way. Of course, when it is desired that the shearing blades operate upon every revolution of the shearing rolls, the upper roll 145 may be maintained in its operative position by holding the upper end of the lever 170 in its outer position with the use of the stop member 173. When a cam disk 247 is being employed to effect an automatic operation of the lever 170 at predetermined intervals, the operator may, if he desires, bring about the actuation of the shearing blades at other times by actuating the hand lever 245 on the shaft 243. With a particular cam disk 247 and with a particular setting of the hand wheel 210 for obtaining a predetermined speed of the driving mechanism, successive lengths of the metal strip may be cut therefrom which are identical or sufficiently so for commercial purposes. If the machine is to be employed for cutting relatively short lengths or lengths less than the length which would be obtained by one rotation of the shearing rolls or a multiple number of rotations, the shearing rolls are operated at such a speed that the linear speed of the shearing blades is greater than that of the moving metal strip and, under these circumstances, the table 105 is reversed in its position so that it curves downwardly as illustrated in Figs. 4 and 19. The metal strip 30 then has a normal sag therein as it moves from the evener to the shearing machine and at the instant when it is engaged by the shearing blades, the amount of this sag is decreased as shown at 30$^b$ in Fig. 4. Then, when the metal strip is sheared off by the blades and the strip falls again into contact with the depressed portion of the table 105, its forward end recedes from the shearing rolls instead of advancing therethrough, as in the operation previously described, so that a relatively short length is advanced between the shearing rolls by the action of the feed rolls 44, before the next operation of the shearing blades takes place. By suitably varying the speed of rotation of the shearing rolls in combination with the depressed arrangement of the feeding table shown in Fig. 4, the operator may obtain a relatively wide range of lengths of metal strips which are less than the length which would normally pass between the shearing rolls upon each rotation thereof, if the depression in the feeding table were not employed. Thus, by the use of the depressed feeding table in combination with relatively high speeds of rotation of the shearing rolls and the use of the upwardly curved feed table in combination with the relatively lower speeds of rotation of the shearing rolls, as compared with the constant speed of the advancing metal strip, a large variation in finer graduations of length may be obtained with the use of a particular cam disk 147. When the shearing operation has proceeded to the point where all of the elongated metal strip has been cut up into sections of predetermined length except for the last portion which, although longer than the predetermined lengths to be cut, is so short that its rear end leaves the last feeding rolls 44 before its forward end reaches the shearing rolls 145, the operator may cause this last portion to be fed through the shearing rolls by pressing downwardly on the lever 136 in order to bring the auxiliary feeding rolls 126 into driving engagement with the metal strip. In the normal operation of the machine, the auxiliary feeding rolls 126 are not necessarily in close contact with both sides of the metal strip and the upper roll 126 assumes its uppermost position under the influence of the springs 130.

Although one form of the invention has been shown and described by way of illustration, it will be understood that it may be constructed in various other embodiments within the scope of the appended claims.

We claim:

1. The combination in metal shearing apparatus, of means for feeding an elongated metal strip, a shearing device, means for supporting said strip in a curved position between said feeding means and said shearing device, and means for operating said shearing device at a speed adapted to alter said curvature at the instant of shearing the strip.

2. The combination in metal shearing apparatus, of rotary shearing blades, means for feeding an elongated metal strip into the path of movement of said blades, means for maintaining a longitudinal curvature in said strip between said shearing blades and said feeding means, means for separating the axes of rotation of said blades, means for moving said axes towards each other at predetermined intervals to render said blades operative in shearing said metal strip, and means for operating said rotary shearing blades at a speed adapted to alter said curvature at the instant of shearing said strip.

3. The combination in metal shearing apparatus, of a pair of rotary shearing blades, means for rotating said blades, feeding means for moving an elongated metal strip endwise at constant speed between said blades, means for separating said blades to permit the rotation thereof without shearing said strip, means for automatically operating said separating means at predetermined intervals, and additional manually operated means for actuating said separating means.

4. The combination in metal shearing apparatus, of a pair of shearing rolls provided with shearing blades, means for rotating said rolls, means for varying the speed of said rotation, means normally separating said rolls to render said blades inoperative, means for feeding a metal strip endwise between said rolls, means for moving said rolls toward each other to render said blades operative in shearing said metal strip, and means for predetermining the number of inoperative rotations of said shearing rolls which occur between successive operations of said last named means.

5. The combination in metal shearing apparatus, of a pair of shearing rolls provided with shearing blades, means for rotating said rolls, means for varying the speed of said rotation, means normally separating said rolls to render said blades inoperative, and means for bringing said shearing rolls into close spaced relation to cause said blades to shear said metal strip upon each rotation thereof.

6. The combination in metal shearing apparatus, of a pair of shearing rolls provided with shearing blades, means for rotating said rolls, means for varying the speed of said rotation, means normally separating said rolls to render said blades inoperative, means for bringing said shearing rolls into close spaced relation to cause said blades to shear said metal strip upon each rotation thereof, and means for maintaining a longitudinal curvature in said metal strip as it approaches said shearing rolls.

7. The combination in metal shearing apparatus, of a pair of rotatable shearing rolls provided with shearing blades, means normally separating said rolls, means for moving one of said rolls into operative relation with the other, means for driving said rolls, and means actuated intermittently by said driving means for effecting the operation of said means for moving one of said rolls toward the other.

8. The combination in metal shearing apparatus, of a pair of rotatable shearing rolls provided with shearing blades, means normally separating said rolls, means for moving one of said rolls into operative relation with the other, means for driving said rolls, means actuated intermittently by said driving means for effecting the operation of said means for moving one of said rolls toward the other, a cam for controlling said last named means, and means for permitting the replacement of said cam by another of different form.

9. The combination in metal shearing apparatus, of a pair of rotatable shearing rolls provided with shearing blades, means normally separating said rolls, means for constantly rotating said rolls, means for feeding a metal strip endwise between said rolls, means for moving said shearing rolls into shearing relation with each other, continuously operating actuating means, and means for intermittently establishing an operating connection between said actuating means and said moving means.

10. The combination in metal shearing apparatus, of a pair of rotatable shearing rolls provided with shearing blades, means normally separating said rolls, means for constantly rotating said rolls, means for feeding a metal strip endwise between said rolls, means for moving said shearing rolls into shearing relation with each other, continuously operating actuating means, and means comprising a continuously operating cam for intermittently establishing a driving connection between said actuating means and said moving means.

11. The combination in metal shearing apparatus, of a pair of rotatable shearing rolls provided with shearing blades, means normally separating said rolls, means for constantly rotating said rolls, means for feeding a metal strip endwise between said rolls, means for moving said shearing rolls into shearing relation with each other, a continuously operating cam, an actuating lever adapted to be intermittently operated by said cam, and means for establishing at predetermined intervals a driving connection between said lever and said moving means.

12. The combination in metal shearing apparatus, of a pair of rotatable shearing rolls provided with shearing blades, means normally separating said rolls, means for constantly rotating said rolls, means for feeding a metal strip endwise between said rolls, means for moving said shearing rolls into shearing relation with each other, a continuously operating cam, an actuating lever adapted to be intermittently operated by said cam, a rod connected to operate said moving means and having a notch therein, and means comprising a continuously operating cam for moving said notch into engagement with said lever at predetermined intervals.

13. The combination in metal shearing apparatus, of a pair of side frames, a pair of shearing rolls, bearing blocks for said shearing rolls mounted in said side frames, the bearing blocks of one of said rolls being movable in said side frames, means tending normally to move said last named bearing blocks in one direction, and means comprising wedges for moving said last named bearing blocks in the opposite direction.

14. The combination in metal shearing apparatus, of a pair of side frames, a pair of shearing rolls, bearing blocks for said shearing rolls mounted in said side frames, the bearing blocks of one of said rolls being movable in said side frames, means acting normally to move said last named bearing blocks in one direction, means comprising wedges for moving said last named bearing blocks in the opposite direction, a lever connected to said wedges for operating them, means for actuating said lever, and means for effecting a predetermined intermittent operation of said actuating means.

15. The combination in metal shearing apparatus, of rotary shearing rolls, feeding rolls spaced from said shearing rolls for feeding a metal strip endwise thereto, an elongated table over which said metal strip passes from said feeding rolls to said shearing rolls, and normally separated auxiliary feeding rolls located adjacent said shearing rolls for feeding said metal strip after the trailing end thereof has passed out of engagement with said first named feeding rolls.

16. The combination in metal shearing apparatus, of rotary shearing rolls, feeding rolls spaced from said shearing rolls for feeding a metal strip endwise thereto, an elongated table over which said metal strip passes from said feeding rolls to said shearing rolls, normally separated auxiliary feeding rolls located adjacent said shearing rolls for feeding said metal strip after the trailing end thereof has passed out of engagement with said first named feeding rolls, and means for driving said first named feeding rolls and said auxiliary feeding rolls at the same speed.

17. Metal shearing apparatus, comprising means for continuously feeding an elongated metal strip, a flying shearing device, means between said feeding means and said shearing device having one side shaped for supporting said metal strip in an upwardly curved position and the reverse side shaped to permit the metal strip to sag, and means for reversing the position of said supporting means.

18. Metal shearing apparatus, comprising means for continuously feeding an elongated metal strip, a flying shearing device, means between said feeding means and said shearing device having one side shaped for supporting said metal strip in an upwardly curved position and the reverse side shaped to permit the metal strip to sag, means for reversing the position of said supporting means, and means for varying the speed of operation of said shearing device.

19. Metal shearing apparatus, comprising means for continuously feeding an elongated metal strip, a flying shearing device, a curved feed table mounted between said feeding means and said shearing device having one side shaped for supporting said metal strip in an upwardly curved position and the reverse side shaped to permit the metal strip to sag, and means for supporting said feed table on a pivotal axis to permit the reversal of the direction of curvature of said table.

20. Metal shearing apparatus, comprising means for continuously feeding an elongated metal strip, a flying shearing device, a curved feed table mounted between said feeding means and said shearing device having one side shaped for supporting said metal strip in an upwardly curved position and the reverse side shaped to permit the metal strip to sag, an auxiliary feed table mounted between said first-mentioned table and said shearing device, and adjustable guiding means carried by said auxiliary feed table.

21. The combination in metal shearing apparatus, of means for feeding an elongated metal strip endwise, supporting means receiving said strip from said feeding means and maintaining a transverse deflection therein during its movement, a shearing device located in advance of said supporting means for severing said strip and changing the degree of said deflection at the instant of severance, means for varying the speed of travel of said metal strip, and means for varying the speed of operation of said shearing device.

22. The combination in metal shearing apparatus, of a pair of rotary shearing blades, means for rotating said blades, feeding means for moving an elongated metal strip endwise between said blades, means for separating said blades to permit the rotation thereof without shearing said strip, means for bringing said rolls into operative shearing relation at predetermined intervals, and means operative during the actuation of said shearing apparatus for varying the length of said intervals.

23. The combination in metal shearing apparatus, of a pair of rotatable shearing rolls provided with shearing blades, means for supporting said rolls to permit relative separation thereof, means for effecting relative movement of said rolls to render said shearing blades operative for shearing purposes, means for driving said rolls, means actuated intermittently by said driving means for effecting the operation of said means for effecting relative movement of said rolls, a cam for controlling said last-named means, and means for permitting the replacement of said cam by another of different form.

In witness whereof, we have subscribed our names.

CHESTER M. MacCHESNEY.
RALPH H. NORTON.